No. 628,741. Patented July 11, 1899.
W. BELL.
AUTOMATIC MANURE LOADER.
(Application filed Apr. 10, 1899.)

(No Model.) 2 Sheets—Sheet 1.

WITNESSES
INVENTOR
William Bell
by his Atty

THE NORRIS PETERS CO., PHOTO-LITHO., WASHINGTON, D. C.

No. 628,741. Patented July 11, 1899.
W. BELL.
AUTOMATIC MANURE LOADER.
(Application filed Apr. 10, 1899.)
(No Model.) 2 Sheets—Sheet 2.

WITNESSES
INVENTOR

UNITED STATES PATENT OFFICE.

WILLIAM BELL, OF DODGE CENTER, MINNESOTA.

AUTOMATIC MANURE-LOADER.

SPECIFICATION forming part of Letters Patent No. 628,741, dated July 11, 1899.

Application filed April 10, 1899. Serial No. 712,496. (No model.)

*To all whom it may concern:*

Be it known that I, WILLIAM BELL, a citizen of the United States, residing at Dodge Center, in the county of Dodge and State of Minnesota, have invented certain new and useful Improvements in Automatic Manure-Loaders; and I do hereby declare the following to be a full, clear, and exact description of the invention, such as will enable others skilled in the art to which it appertains to make and use the same.

My invention relates to manure loaders and spreaders designed particularly for use in barn-yards; and it consists of certain novel constructions, combinations, and arrangements of parts, as will be hereinafter fully described and claimed.

The object of my invention is to provide a manure spreader and scraper which is evenly balanced and easily controlled, the said scraper being capable of adjustment to any required angle for gathering up the manure and also adjusted to another required inclination for removing the load therefrom, as desired, or for dumping the same at the rear at one operation, if preferred.

Figure 1:
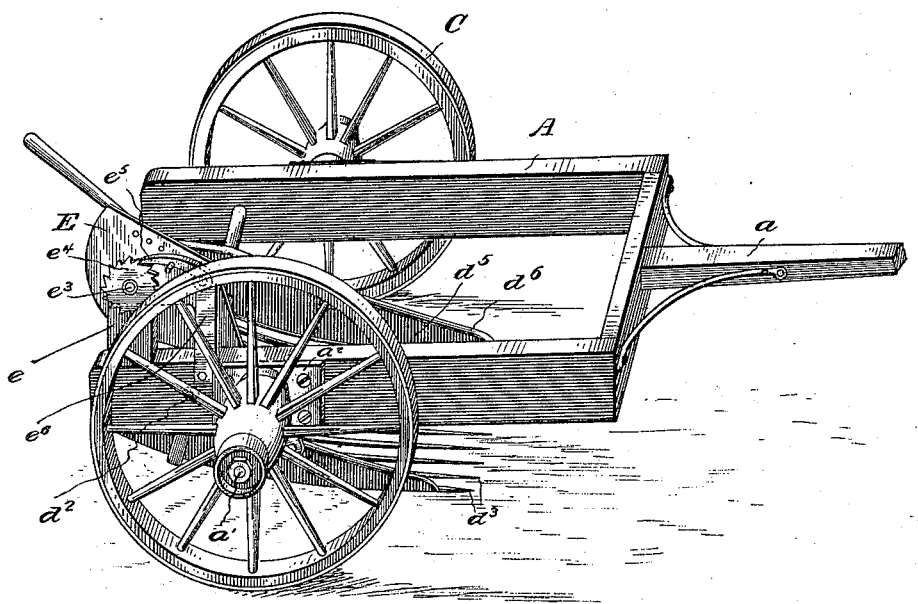
Figure 2:
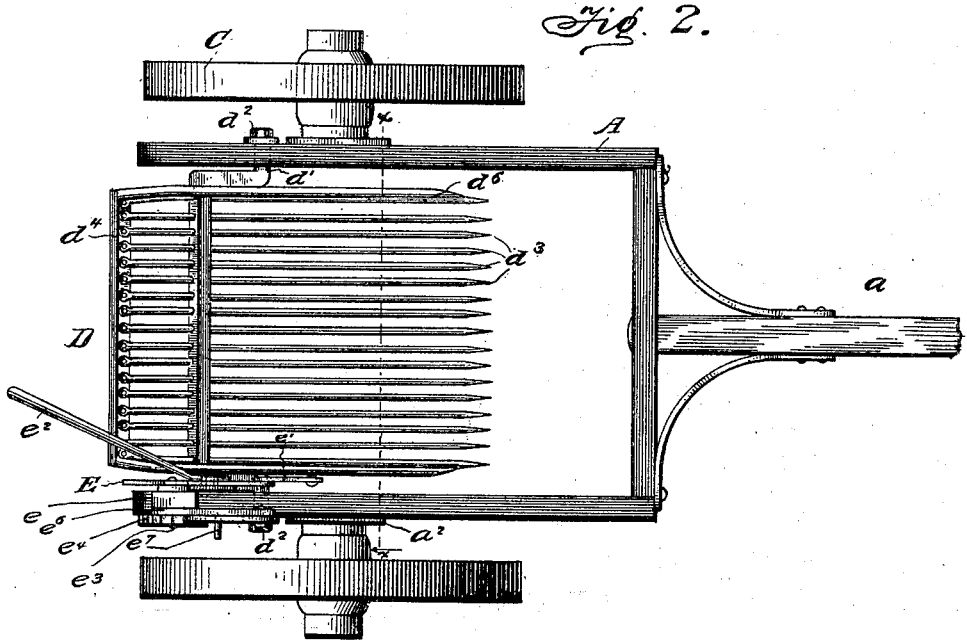
Figure 3:
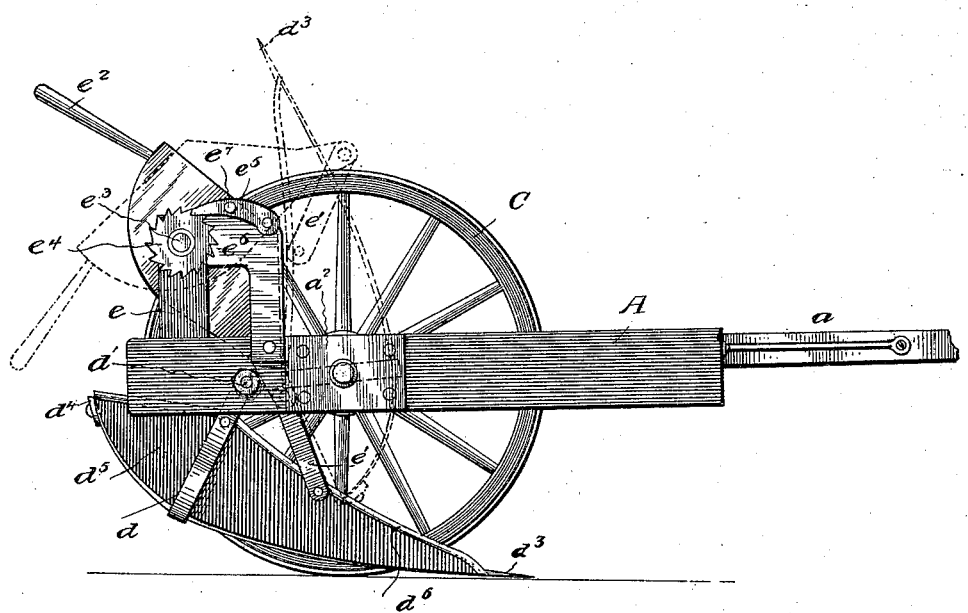
Figure 4:
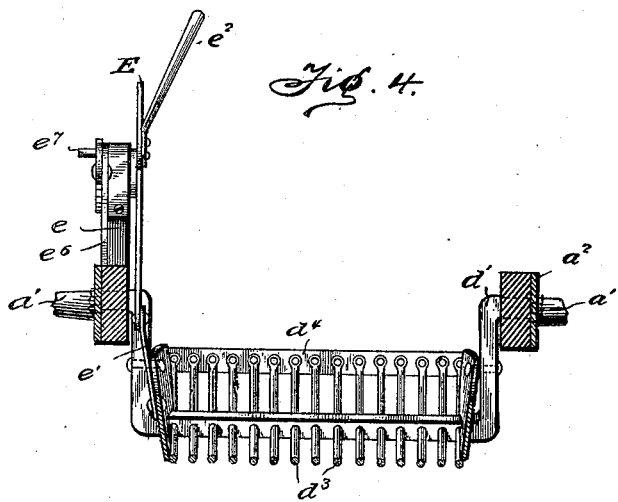

In the accompanying drawings, Figure 1 is a perspective view of my improved manure loader and spreader. Fig. 2 is a top plan view of the same. Fig. 3 is a side elevation with one wheel removed and showing in dotted lines the scraper in an elevated position, and Fig. 4 is a transverse section through the machine on the line $x\,x$ of Fig. 2.

A in the drawings represents the frame of the machine, which is rectangular in form and open at the rear and is provided with a suitable tongue or pole $a$. The frame is provided with suitable axles $a'\,a'$ at suitable points, preferably about one-third the distance from the rear end thereof, and which extend laterally therefrom and are secured to the said frame by means of suitable plates or bearings $a^2$, said axles carrying suitable wheels C, as shown. By providing the machine with only two wheels and locating said wheels at about the points designated a very evenly balanced machine is produced and one that can be turned in a very short space, as well as being capable of being run very close into corners, and also by this construction the load will be very close to the power, which is a decided advantage over scrapers employing four wheels. The scraper D is pivotally hung in the frame A by means of a U-shaped bar $d$, having outward-extending ends $d'$, which pass through the frame A, the outer ends thereof being provided with screw-threads to receive nuts $d^2$, as shown. The U-shaped bar is located a considerable distance back from the forward end of the scraper, so that all liability of clogging is avoided, and at the same time the scraper is securely strengthened and held in position thereby. The tines $d^3$ of the scraper extend through the U-shaped bar $d$ and are held suitably spaced thereby. These tines have a very slight curvature forward of said bar $d$, being almost straight, but in rear thereof have a considerable upwardly-curved inclination, by reason of which construction the gathering of the manure is greatly facilitated and the capability of holding the load on the scraper increased. The rear ends of the tines are secured to a flat bar $d^4$ in any suitable manner, which latter is secured at its outer ends to solid side plates $d^5$, which latter extend upwardly a considerable distance and serve to prevent the gathered manure from falling off the scraper at these points. The upper edges of the sides at the rear are approximately horizontal when the scraper is in a normal gathering position and taper downwardly from this point toward the forward ends of the tines and terminate just in rear of said forward ends, as clearly shown in Figs. 1 and 3. The sides $d^5$ are reinforced at their upper edges by a suitable bead or enlargement $d^6$, secured thereto, as also plainly seen in the drawings. The sides are also secured to the outer tines and to the U-shaped bar $d$, so as to secure them rigidly in place, which strengthens the scraper at these points.

The means for raising and lowering the scraper and holding it in an adjusted position consists of an arm or plate E, which is pivotally secured to a standard $e$, extending upwardly from the frame. The forward end of this arm or plate is connected to one of the side pieces or plates $d^5$ by means of a link $e'$, pivoted to the said side and to the outer end of said arm or plate E. The arm or plate E is provided with an operating-handle $e^2$, extending rearwardly therefrom, and is bent slightly inward to bring it within easy reach of the operator. The journal $e^3$, which passes through the upwardly-extending standard and to which the frame E is secured, is provided on its outer end with a ratchet $e^4$, which is adapted to be engaged by a pawl $e^5$ when the scraper is adjusted from one position to another and to hold the said scraper in such adjusted position. The pawl $e^5$ is pivoted to a suitable support $e^6$, which is secured to the frame of the machine. The pawl is provided with a small knob or handle $e^7$, by which it can be disengaged from the ratchet when desired.

My improved loader and spreader is not designed to dump the load forward of the scraper, but in the rear, and in this respect differs from the ordinary road-scrapers which are capable of dumping forwardly or turning completely over to discharge the load. I have so constructed and located the U-shaped bar $d$ and the arm or plate E and the link connected thereto that the forward inclination of the scraper is limited by said arm or plate coming in contact with the upper end of the U-shaped bar.

From the aforegoing description it will be seen that I have produced a manure loader and spreader which is evenly balanced and which can be handled with great facility and readily adjusted to the required position for gathering the manure and which after the load has been gathered can be adjusted to the desired rearward inclination to enable the manure to be unloaded either by a fork in desired quantities or to be dumped at the rear at one operation.

Having now described my invention, what I claim as new, and desire to secure by Letters Patent, is—

1. A manure loader and spreader comprising in its construction a rectangular frame mounted on two wheels, the scraper having tines, said scraper being pivoted in the frame, and means for raising and lowering the said scraper and holding it in the adjusted position comprising an arm pivoted to the frame, a link connecting one end of the arm with the scraper, an operating-handle connected to the said arm and a ratchet carried by said frame, and a pawl adapted to engage said ratchet, substantially as described.

2. A manure loader and scraper comprising in its construction a rectangular frame open at its rear and mounted on two wheels, an arched or U-shaped bar pivoted in the sides of the frame, a balanced scraper proper, said scraper comprising tines and solid sides which are connected to the arched bar, said tines being disconnected at their front ends and extending in a disconnected manner to the arched bar so that they will have a spring action, and means for raising and lowering the said scraper proper and holding it in an adjusted position, substantially as described.

3. A manure loader and spreader comprising in its construction a rectangular frame open at the rear and mounted on two wheels, the scraper having tines, said scraper being pivoted in the frame by means of a U-shaped bar located near the rear of the scraper and through which the tines pass, vertical solid sides on said scraper which are secured to the outer tines and to the U-shaped bar, a bar connecting the rear ends of the tines, and means for raising and lowering the scraper and holding it at the desired adjusted position, substantially as described.

In testimony whereof I hereunto affix my signature in presence of two witnesses.

WILLIAM BELL.

Witnesses:
J. I. TAYLOR,
B. F. HOOD.